Jan. 17, 1950  N. R. HUNTINGTON  2,494,945
VEHICLE DRIVE
Filed May 2, 1946  3 Sheets-Sheet 1

Inventor
Nathaniel R. Huntington
By Wilfred E. Lawson
Attorney

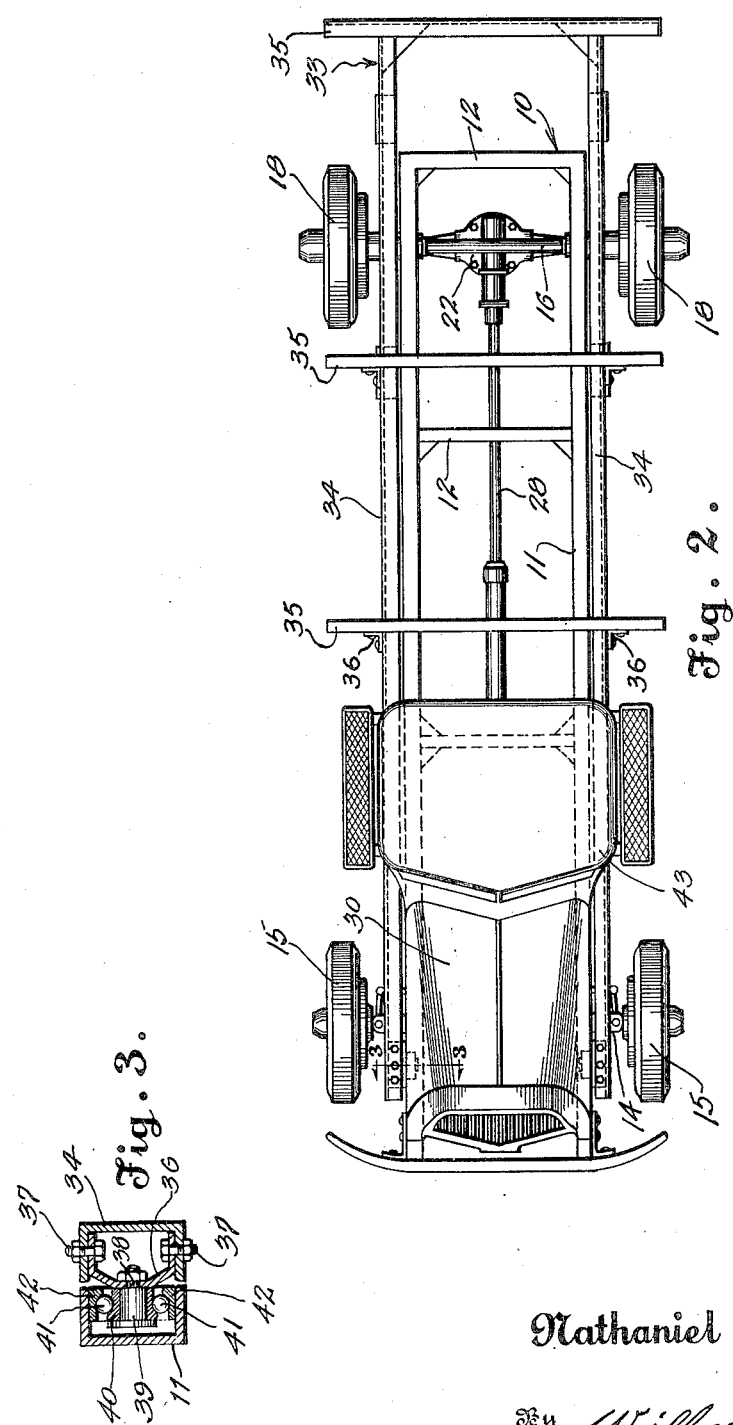

Jan. 17, 1950 N. R. HUNTINGTON 2,494,945
VEHICLE DRIVE
Filed May 2, 1946 3 Sheets-Sheet 3

Inventor
Nathaniel R. Huntington
By Wilfred E. Lawson
Attorney

Patented Jan. 17, 1950

2,494,945

UNITED STATES PATENT OFFICE 2,494,945

VEHICLE DRIVE

Nathaniel R. Huntington, Hilts, Calif.

Application May 2, 1946, Serial No. 666,614

3 Claims. (Cl. 180—71)

The present invention relates to motor vehicles and has particular reference to mechanism wherein load forces are utilized to impart a rolling drive to the traction wheels of a vehicle.

Although efforts have previously been made to provide mechanism employing this general principle, these have not proven entirely satisfactory for the reason that they have mainly used a link or equivalent connection between the movable drive axle and the dead axle so as to preclude most effective utilization of the load forces.

Accordingly, it is a primary object of the present invention to provide mechanism of the aforesaid character which utilizes the load forces with maximum efficiency.

Another object of the invention is to provide a motor vehicle having an improved frame structure for carrying the loads of the vehicle.

A further object of the invention is to provide a motor vehicle of the above character wherein a load carrying frame member is movably associated with a complementary frame member.

Still another object of the invention is the provision of a motor vehicle of generally improved construction.

Other objects and advantages of the invention will become apparent as the description progresses.

Referring to the drawings, wherein, for the purpose of illustration, is shown a preferred embodiment of the invention:

Figure 2 is a top plan view of the same.

Figure 3 is an enlarged sectional view taken on line 3—3 of Figure 2.

Figure 1:
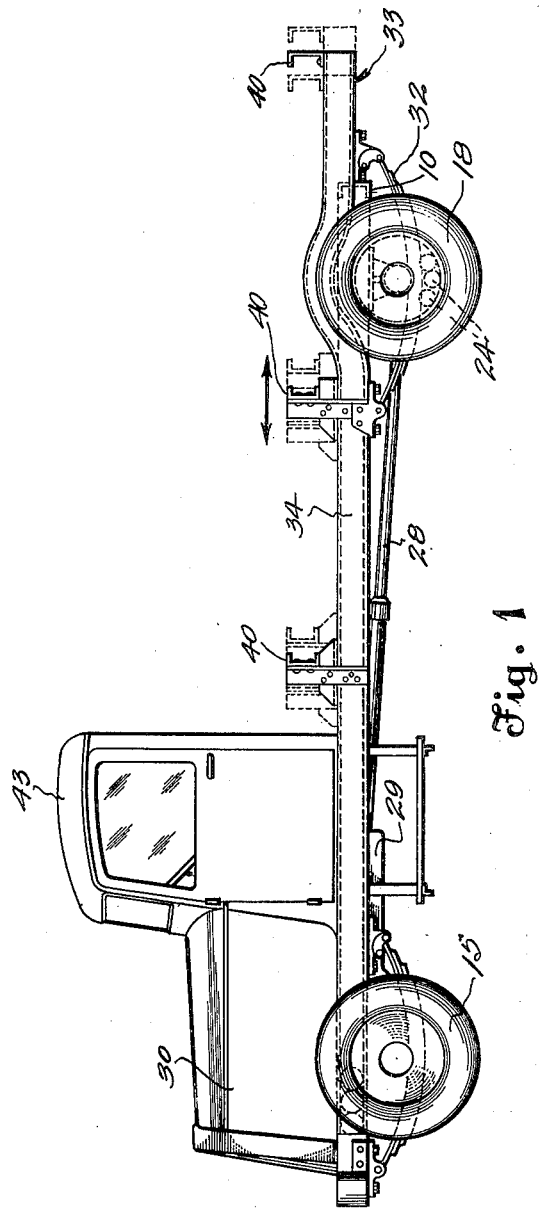
Figure 1 is a side elevational view of a vehicle embodying the invention.

Referring to the drawings, wherein like reference characters designate corresponding parts throughout, 10 designates one of the frame sections of the vehicle, advantageously of elongated, rectangular configuration having channel bars 11 at the sides rigidly connected by cross bars 12. Frame channels 11 are disposed so that their web portions are vertical while their flanges are directed outwardly for a purpose which will hereinafter appear.

At the forward portion of frame 10 is mounted, in any preferred manner, a conventional front axle 14 on the steering spindles of which are mounted road wheels 15. At the rear end of frame section 10 is mounted an axle 16, in the present example constituting a unitary dead axle member secured below the frame 10, as by hangers 17, and having rotatably mounted upon each protruding end portion a traction wheel 18. Each of the traction wheels 18 preferably embodies a hub carrying body disk 19 provided with a pneumatic tire engaging rim 20 formed to provide, at the inner side of the disk, an annular cylindrically shaped internal ring 21 which functions as a wheel or gear of the friction type.

Below dead axle 16, which has its intermediate portion bowed upwardly to afford clearance, is mounted a differential drive gear housing 22 to which are connected axle housing members 22' in which are journaled a pair of rotary axle shafts 23. On the outer end of each axle shaft 23 is keyed, or otherwise fixed a friction wheel 24 designed to assume driving engagement with the interior of the ring 21 fixed to each traction wheel, as shown to advantage at Figure 4. In the embodiment of the invention herein illustrated the operatively engaging elements 21 and 24 are of frictionally engaging form of any preferred known make, although other forms of drive elements such as spur gearing or the like may obviously be employed when the conditions so require. Shafts 23 of the drive axle are driven through preferred conventional differential, propeller shaft and transmission gearing 27, 28 and 29 respectively driven by a front mounted engine within hood 30.

Movably associated with frame section 10 and supported upon the drive axle housing 22', as by springs 32, is what I term the load carrying frame 33 of the vehicle, having a rectangular contour normally assuming a position substantially externally of frame 10 with its length substantially greater than the latter to allow substantial lengthwise movement. This exterior frame 33 has channelled side bars 34 spaced slightly from the bars 11 of frame 10 with the flanges of channels 34 directed inwardly. Thus it will be seen that frame section 10 essentially constitutes a guide frame maintaining the axis of the front load carrying wheels 15 and the rear traction wheels 18 in fixed longitudinally spaced relationship while outer frame 33 is designed to carry all or the major part of the load of the vehicle.

Adjacent the forward end of each frame bar 34 is mounted a channel shaped bracket 36 having its upper and lower flanges fixed to the flanges of bar 34, as by bolts 37. To the web of bracket 36 is fastened the reduced and threaded shank 38 of a headed stud 39 fitted within a collar 40, the exterior of which is shaped to form the inner race for ball bearings 41. Concentrically about collar 40 is a ring 42 having an external diameter such that it may roll longitudinally in frame channel 11 and an internal configuration providing a race for bearings 41. These connections permit movement of frame 33 longitudinally of frame 10 as well as vertical pivotal movement about the axis of studs 39, enabling the load carrying structure to move freely in accordance with the tendency of the drive shaft to oscillate about the axis of the dead axle and thus fully utilize the weight forces to transmit leverage upon the traction wheels. Upon the rear portion of load carrying frame 33 may advantageously be mounted a plurality of body supporting cross bars 35, elevated to provide clearance for inner frame 10 and designed to support thereon a desired body structure. In addition to supporting the vehicle body and the load transported thereby it is preferable that frame 33 carry the engine together with the vehicle cab 43 and associated hood structure in order to apply the maximum weight upon the drive axle.

Figure 4:
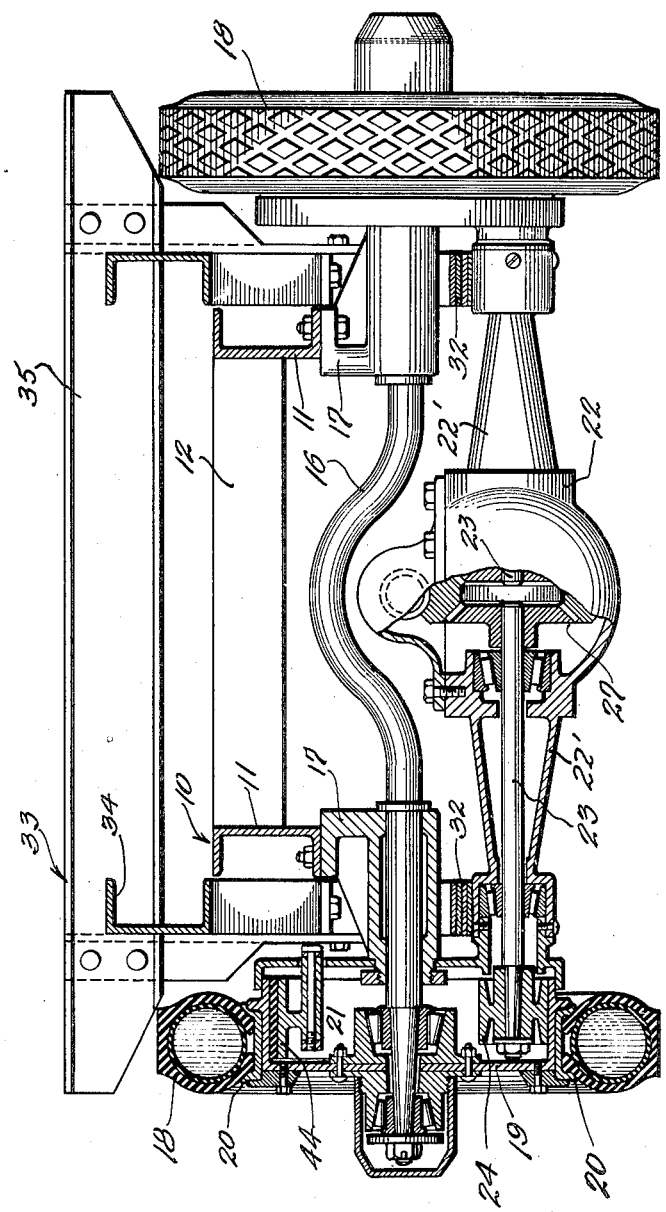
Figure 4 is a rear elevational view of the vehicle partly in section.

While brake mechanism of known character can be employed on the vehicle, as upon the axle shafts or the like, brake means employing the drum or internal wheel 21 as a drum, as shown at Figure 4, can advantageously be used. Thus, pivotally supported shoe 44 is mounted so as to releasably engage the arcuate portion of the internal wheel 21 without interference with the oscillatory movement of the drive wheel 24 to provide for traction wheel braking.

It will thus be seen that driving power from the engine is transmitted, through the shafts 23 of the drive axle and wheels or pinions 24, to the annuli or internal wheels 21 of the traction wheels, so as to apply torque thereto. When forward or rearward movement of the vehicle is impeded, as by the inclination or uneven condition of a roadway, drive wheels 24 may travel through arcs of substantial angularity to exert a rolling leverage upon the traction wheels, dependent upon the load carried by the vehicle, to impart driving power substantially augmenting that of the driving torque as well as materially assisting in overcoming spin of the traction wheels on muddy or ice covered roads. Furthermore, the fact that the drive axle assembly is entirely disconnected from the dead axle enables maximum utilization of the gravity forces of the vehicle load in the concentrically oscillatable movement of the drive wheel 24 with relation to the axis of the traction wheel.

From the foregoing description it is thought to be obvious that a vehicle drive constructed in accordance with my invention is particularly well adapted for use by reason of the convenience and facility with which it may be assembled and operated.

I claim:
1. In a motor vehicle, including the traction wheels thereof, a load supporting frame, a second frame within said load supporting frame, a fixed axle carried by said second frame and having a traction wheel mounted on each of its ends, a differential and drive axle assembly including a housing therefor carried by said load supporting frame and disposed vertically below said fixed axle, an annular member mounted on each of said traction wheels, a friction wheel mounted on the outer ends of each drive axle and disposed in contact with the inner surface of a complemental of said annular members, a propellor shaft connecting said differential and drive axle assembly with the power plant of the vehicle, and means coupling the forward ends of said frames whereby said load supporting frame will have limited pivotal and longitudinal movements relative to said second frame correspondingly for the starting, running and braking, conditions of operation of the vehicle, substantially as and for the purposes set forth.

2. The invention as defined in claim 1, with the said frames having side members formed of lengths of channel iron and disposed with the channels thereof opposed, a stud mounted in the channel of each of the side members of said second frame and projecting into the adjacent channels of the side members of said load supporting frame, and rollers mounted on said studs and disposed in rolling contact with the lower and upper side walls of the latter channels, said studs and rollers constituting the aforesaid coupling means at the forward ends of said frames.

3. The invention as defined in claim 1, with a brake shoe mounted adjacent to a portion of the inner surface of each of said annular members opposite the surface engaged by the friction wheel for braking cooperation therewith whenever a slowing down or stoppage of the vehicle is required.

NATHANIEL R. HUNTINGTON.

REFERENCES CITED

The following references are of record in the file of this patent:

UNITED STATES PATENTS

| Number | Name | Date |
|---|---|---|
| 637,015 | O'Donnell | Nov. 14, 1899 |
| 1,252,759 | Wilson | Jan. 8, 1918 |
| 1,352,625 | Pospeshil | Sept. 14, 1920 |
| 2,014,071 | Loveless | Sept. 10, 1935 |
| 2,032,873 | Garlick | Mar. 3, 1936 |
| 2,043,185 | Miesse | June 2, 1936 |
| 2,134,687 | Dunham | Nov. 1, 1938 |
| 2,151,615 | Potter | Mar. 21, 1939 |